United States Patent [19]

Friesen

[11] Patent Number: 5,409,729
[45] Date of Patent: Apr. 25, 1995

[54] HEAT EXPANDED WHOLE KERNEL CORN SNACK FOOD

[75] Inventor: Stanley A. Friesen, Mountain Lake, Minn.

[73] Assignee: GEF, Inc., Mountain Lake, Minn.

[21] Appl. No.: 77,020

[22] Filed: Jun. 15, 1993

[51] Int. Cl.$^6$ ............................................. A23L 1/18
[52] U.S. Cl. .................................. 426/625; 426/441; 426/460; 426/808
[58] Field of Search ................. 426/460, 625, 441, 808

[56] References Cited

U.S. PATENT DOCUMENTS

| | | |
|---|---|---|
| 3,027,258 | 3/1962 | Markakis et al. . |
| 3,407,070 | 10/1968 | Murray et al. . |
| 3,619,211 | 11/1971 | Chang et al. . |
| 3,647,474 | 3/1972 | Dame, Jr. et al. . |
| 3,652,294 | 3/1972 | Marotta et al. . |
| 3,719,501 | 3/1973 | Rispoli et al. . |
| 3,925,567 | 12/1975 | Abe . |
| 4,073,958 | 2/1978 | Abe . |
| 4,499,113 | 2/1985 | Mochizuki et al. . |
| 4,640,842 | 2/1987 | May .................................. 426/618 |
| 4,767,635 | 8/1988 | Merritt et al. .................... 426/460 |
| 4,806,377 | 2/1989 | Ellis et al. . |
| 4,847,103 | 7/1989 | Saita et al. ....................... 426/460 |
| 4,931,303 | 6/1990 | Holm et al. . |
| 4,970,084 | 11/1990 | Pirrotta et al. . |
| 5,284,666 | 2/1994 | Garf ................................. 426/93 |

Primary Examiner—Donald E. Czaja
Assistant Examiner—Mary S. Mims
Attorney, Agent, or Firm—Merchant, Gould, Smith, Edell, Weiter & Schmidt

[57] ABSTRACT

A heat expanded whole kernel corn snack food, and a process of making such a corn snack food is disclosed. The corn snack food is made by selecting a corn variety, drying corn kernels of the corn variety to less than about 20 wt. %, soaking the dried corn kernels in water to achieve a moisture content of above about 25 wt. %, separating the soaked corn kernels from the water, heating the soaked corn kernels in an edible oil to expand the kernel and cook the starches interior to effect desirable flavor and texture and then separating the expanded corn kernels from the oil. Seasonings may be added to the fried product.

15 Claims, No Drawings

HEAT EXPANDED WHOLE KERNEL CORN SNACK FOOD

FIELD OF THE INVENTION

The invention is directed to a substantially whole corn kernel snack food made by heating kernels of a selected corn in a suitable oil to result in a heat expanded kernel that can be eaten as a snack. The snack product is neither a popped corn nor a flat chip snack.

BACKGROUND OF THE INVENTION

Snack-type foods are very popular. Items generally known as snack foods include, for example, potato chips, corn chips, cookies, crackers and popped corn. Such products can be made from whole grain corn, wheat, rice, potatoes, or can be made from other starchy byproduct materials such as a paste, roux, mash or other dough. The term "snack foods" generally refers to cooked foods which are adaptable to be eaten from the hand. Typically snack foods are small in size, relatively dry, can be preserved for a period of time and easily transportable. Many commonly available snack foods are made from starch or flours. Examples of such include cookies and crackers. Other snack foods may be made by directly processing agriculture products. Examples include potato chips and popped corn.

Snack foods that are made from starch or flours typically involve mixing flour and starch with water to form a dough and then further processing the dough. However, there is a growing tendency for the public to prefer foods that are more "natural." A snack food that is made directly from an agriculture product without first processing the agricultural product to starch or flour form generally contains more vitamins and fibers. A snack food that is produced from an agriculture product would be preferred by the health conscious public if the snack food also possesses acceptable characteristics of taste and mouthfeel.

Corn is a widely available, non-expensive raw material for making snack foods. However, snack foods that are made from whole kernels of corn have not been met with wide acceptance. The reason is that kernels of corn that are made into snack foods are sometimes hard to chew or lack characteristic flavor or mouthfeel that is perceived to be superior to other snack foods. Nevertheless, snack foods made with whole kernels of corn are available in the market. Examples are CORN-NUTS ™ (Cornnuts, Inc., Oakland, Calif.) and UGLY NUTS™ (Sweetcorn Products, Bloomfield, Nebr.).

Corn is a major food staple that has been genetically refined to the development of hybrid varieties. To date, the majority of corn grown is yellow dent corn. Dent corn is characterized by a starch composition that is about 75% amylopectin and about 25% amylose. Amylopectin is a branch-chained polysaccharide, whereas amylose is a straight-chain polysaccharide. Hybrid corns are available wherein the starch composition is essentially all amylopectin. These amylopectin hybrids are referred to as waxy corns. The varying amounts of amylopectin and amylose in the starch composition of dent and waxy corns result in substantially different starch characteristics. Thus, dent and waxy corns are not considered to be interchangeable materials for most applications.

To date, waxy corns have not been utilized for human food products except to the extent that various wet milling techniques, well known to those skilled on the art, can be used to isolate amylopectin as starch from corn. The starch alone can be used as a raw ingredient for food or can be further processed to derive maltodextrin, high fructose corn syrup or other starch byproducts. Generally, wet milling techniques include grinding, floatation of the grinding product to remove the germ of the kernels, straining to remove fiber and centrifugation to separate protein from starch.

Numerous examples may be cited wherein amylopectin starch is isolated from waxy corn and then incorporated into food products. The isolated amylopectin starch is recognized to form heavy-bodied pastes that are sensitive to shear. The pastes possess high clarity and reduce gelation tendency. However, the use of waxy corns have not been directed to the production of whole kernel food or snack food materials. Field corn is often considered suitable only for animal feed, is low in cost and is under utilized as a source of human nutrition.

Patents that disclose varying aspects of foods using corn byproducts include Markakis et al., U.S. Pat. No. 3,027,258, which describes a synthetic chip-type food product obtained from a dough derived from cereal grains including corn. Maria et al., U.S. Pat. No. 3,407,070, disclosed ready-to-eat food products that comprised a farinaceous base and a starch. Marotta et al., U.S. Pat. No. 3,652,294, teaches a ready-to-eat food product having a pregelatinized starch major component. Ellis et al., U.S. Pat. No. 4,806,377, teaches a low oil content baked corn snack made from a waxy corn masa. Mochizuki et al., U.S. Pat. No. 4,499,113, teaches a snack product having an expanded coating made from a cereal grain starch flour. U.S. Pat. No. 3,619,211 is related to a potato chip type product that can be made with potato and other flours derived from cereals including starch, tapioca, corn, wheat, etc. Dame, Jr. et al., U.S. Pat. No. 3,647,474, teaches snack food product and process comprising a popped popcorn in a dome matrix containing a cereal flour which is fried. U.S. Pat. No. 3,719,501 teaches a novel snack food product comprising comminuted or reduced particle sized popcorn cooked in a dome matrix comprising a combination of a cereal flour and a starch. ABE, U.S. Pat. No. 3,925,567, teaches a process for preparing a snack food from a starch or a starch flour. ABE, U.S. Pat. No. 4,073,958, teaches a snack food made from rice, flour or rice bran and other starch products. Colminel, U.S. Pat. No. 4,931,303, teaches a dough preform made from cereal flours which when fried produces a desirable snack chip having a predetermined surface bubbling characteristic. Pirrotta et al., U.S. Pat. No. 4,970,084, teaches a potato based chip product containing intact vegetable pieces.

Considering the wide availability of corn in the United States and in the world, there is a need for a snack food made from kernels of corn that have not been processed into starch or flour. Such a product would provide the consumers with a choice of a wholesome snack food product. Such a product would also add value to a commodity agricultural product that is of abundant supply.

A substantial need exists in the art for a process that can be used to convert waxy field corn into a desirable human food. For the purpose of this invention, the term heat expanded kernel means a kernel which, when heated, increases in volume to a degree of about 5 fold or less. The expanded kernel obtains a cracked surface shell which promotes the chewability of the material and at the same time obtains an expanded starchy interior which is cooked, softened and improved in flavor. Commonly available popped popcorn is a product which increases in volume substantially greater than 20 fold increase in volume.

SUMMARY OF THE INVENTION

The present invention is directed to a method of producing a corn snack food by heating corn kernels in an edible oil, especially kernels of a field corn to produce an expanded kernel. The method contains the steps of selecting a corn variety based on final taste and processing characteristics, drying kernels of the selected corn variety to a moisture content of less than about 20 wt. %, soaking the dried corn kernels in water to increase the moisture content to above about 25 wt. %, separating the soaked corn kernels from the water, allowing the separated soaked corn kernels to rest for a time sufficient to substantially dry the surface of the soaked corn kernels and to obtain a substantially uniform distribution of moisture within the corn kernels, heating the soaked corn kernels in an effective amount of a suitable edible oil at a temperature of about 300° F. (150° C.) to about 400° F. (205° C.) for a time sufficient to cook the corn without adversely affecting the flavor of the resulting product, separating the cooked corn from the oil, and allowing the cooked corn to cool. The moisture content of the corn kernel promotes a controlled expansion of the kernel that cracks the hull and expands the starchy part to promote edibility. "Field corn" refers to a variety of corn that is commonly grown in the field and harvestable mechanically, for example, with a combine. Typically, such hybrids are bred and grown for animal feeds, starch manufacturing, high fructose corn syrup products, ethanol production and other purposes not related to consumption in kernel form by humans. Examples of field corns are commonly available hybrids such as yellow dent corn, waxy corn, white corn, hy-lysine corn, blue corn, Indian corn, and open pollinated corn. Generally, any commonly available corn variety can be used for making the corn snack food of the present invention. The more preferred hybrids are waxy corn hybrids.

Before the cooking process, the corn kernels are cleaned to remove foreign matter. Generally, the preferred starting materials are corn kernels that contain less than about 20 wt. % of moisture, and more preferably less than 13.5 wt. % of moisture. The corn kernels are then soaked in water to prepare them for the heating process. The length of time necessary for the soaking process is dependent on the temperature of the soaking water. After soaking, the corn kernels are removed from the soaking water and preferably allowed to rest for a period of time before cooking. Corn kernels that have been through soaking, whether allowed a period of rest or not, are referred to as "soaked corn kernels." Typically, the moisture content of the soaked corn kernels is above about 25 wt. %, and preferably about 30 to about 35 wt. %. Corn used in popcorn products is carefully produced to have about 17.0-17.5 wt. % within.

Edible fats and oils can be used for heating the corn kernels. However, oils obtainable from plant sources, for example, olive oil, sesame seed oil, sunflower seed oil, peanut oil, soybean oil, corn oil, and the like are preferred. Soybean oil is most preferable for making the corn snack food of the present invention because it tends to impart a special flavor to the final snack food. When used in conjunction with waxy corn for making the corn snack food of the present invention, soybean oil imparts on the corn snack food a surprising, well received flavor perceived as "buttery."

Generally, when the soaked corn kernels is introduced into hot oil, the corn kernels expand almost immediately. The corn kernels expand to crack the kernel hull and to produce a tender texture. The corn kernels can also be heated and expanded in a separate device before the heating in oil, i.e. frying.

Typically the heating temperature is about 300° F. (150° C.) to about 400° F. (205° C.), preferably about 356° F. (180° C.) to about 383° F. (195° C.) and most preferably about 375° F. (190° C.) when the expanding and frying are done in the same device. Optionally, the expanding and the frying steps can take place in separate cooking devices. In such a case, the expanding process can be any commonly used process known in the art. Preferably the expansion is done in a vegetable oil at about 350° F. (180° C.) to 380° F. (195° C.) and most preferably at about 370°-380° F. (190° C.). Frying is done at a temperature of about 300° F. (150° C.) to about 400° F. (205° C.) and preferably at about 370°-380° F. (190° C.) for a period of about to 2 to 5 minutes, and most preferably at about 375° F. (190° C.) for about 4 minutes. Generally, if desired, expansion can be reduced by frying at a lower temperature.

The weight ratio of oil to soaked corn is about 1:1, and preferably at least 2:1, and most preferably 30:1. There is no upper limit to the ratio since one can use excess oil for heating the corn kernels. The limiting factors are economic constraints because using excessive amounts of oil is not economical. Generally, when the heating/expanding process and the frying process take place in separate devices, the weight ratio of oil to soaked corn in the expanding process is optimized depending on the particular expanding process used. For example, if a particular type of corn is expanded using hot air, little or no additional amount of oil is required. After the cooking process, the cooked corn kernels are separated from the oil and allowed to cool.

After the corn kernels have been expanded and fried, optional seasonings can be added. Seasonings that are suitable include, for example, caramel, cheese such as cheddar cheese, table salt, sea salt, chili powder, garlic, hickory salt, sour cream, chives, onion, chocolate, barbecue flavor, pizza flavor, liquid smoke, and taco flavor. If desired, other less commonly used flavors such as tomato, lemon, puree, carrot, parsley, mushroom, basil, ginger, black pepper, white pepper, green pepper, other fruit and root flavors and the like can also be used. Particularly desirable seasonings for the corn snack foods include caramel, cheeses such as cheddar cheese, chili, garlic, taco seasoning, pizza seasoning, hickory salt, sour cream, chives, onion, chocolate, barbecue flavoring and sea salt.

A corn snack food of the present invention has the advantages of being made from a natural agricultural product. Compared to other types of snack foods such as chips and cookies, the corn snack food of the present invention has the additional advantage of containing much of the protein, mineral and fibers that are present in corn kernels.

DETAILED DESCRIPTION OF THE INVENTION

This invention relates to (a) a method of producing a corn snack food containing steps of selecting a corn variety, drying the kernels of the corn variety, soaking the dried corn kernels in water, separating the soaked corn kernels from the water, cooking the corn kernels in oil, and separating the cooked corn kernels from the oil; and (b) the corn snack food made with this method.

Although many attempts have been made to produce snack foods from whole kernels of corn, products from such efforts have not been very successful. Some products are hard to chew and some have an aftertaste that is not entirely pleasant. The art of making snack foods is far from a precise science in which characteristics such as flavor, texture and mouthfeel can be predicted from the ingredients used in making the snack foods. In the present invention, it is through the careful selection and combination of the type of corn, oil, cooking conditions and other optional ingredients that corn snack foods of surprising and well-received flavor, taste and mouthfeel are made.

Corn

Many varieties of corn are available commercially. Examples include: yellow dent corn, waxy corn, white corn, sweet corn, Indian corn, hy-lysine corn, blue corn, sweet corn, and open pollinated corn. Different varieties or hybrids of corn contain different kinds and concentrations of starches, proteins, fibers, and moisture. These differences contribute to the difference in texture, flavor, mouthfeel and other characteristics that are important to snack foods.

Generally, any variety of corn can be used as a raw material for making the corn snack food of the present invention. Field corn is preferred because of their availability, storability, low cost, high protein and fiber content and size of kernels. Since field corns can be dried and stored, they are available year-round. Because they can be inexpensively grown and harvested mechanically, the cost of corn is low. To the increasingly health-conscious public, the high protein and fiber content is an attractive attribute of many field corns.

Field corns are commonly grown in the field either for animal consumption or for further processing into industrial products or foods. Generally, these field corn varieties were not bred for making the corn snack foods containing whole kernels. Of course, it is possible to especially breed a corn hybrid that has the particular desirable characteristics suitable for making the corn snack food of the present invention. Conceivably, such a specially bred "snack food hybrid" would produce a corn snack food of even more superior quality than products made with existing field corn varieties.

There are many hybrid corn varieties available commercially in the market. Hybrids are produced by crossing two or more pedigrees (or parent stocks) that have traits desired for the resulting hybrid. For example, a parent stock may have a trait of drying down quickly in the field but produces ears near the ground while another parent stock has the trait of producing ears at the right height suitable for mechanical harvesting but does not dry down very quickly. A hybrid that has ears at the right height for mechanical harvesting and dries down quickly may be produced by crossing these two parent stocks.

Plant breeding techniques have been employed to develop corn varieties that have the desirable traits. Yellow dent corn hybrids are counterparts to waxy hybrids. Plant breeding techniques can be used to convert yellow dent hybrids to waxy hybrids. Nonlimiting examples of hybriding techniques include single crosses, two way crosses, three way crosses and open pollination.

A particularly preferred variety of corn for practicing the present invention is waxy corn. Waxy corn differs from other varieties of corn in that kernels of waxy corn contain more amylopectin than other varieties of corn. For example, yellow dent corn starch contains about 75 wt. % of amylopectin and about 25 wt. % of amylose. On the other hand, waxy corn starch is almost 100% amylopectin. Generally, amylose is the soluble constituent of starch and amylopectin is not as soluble as amylose in water. Both amylose and amylopectin are polysaccharides containing glucose units. Amylose is constituted of long unbranched chains while amylopectin is a branched-chain polysaccharide. It is generally believed that because of the branched molecular structure, amylopectin is more easily digestible than amylose. Therefore, digestibility is one advantage of waxy corn.

Waxy corn kernels also tend to heat expand into a useful snack better than other types of hybrids. Furthermore, corn kernels made from other types of hybrids may be tougher and have a more "chewy" character than expanded waxy corn kernels. In addition, a snack food of the present invention made from waxy corn kernels has a superior flavor compared to snack foods made from other hybrids. When a certain preferred waxy hybrid is used in conjunction with soybean oil to make a snack food of the present invention, the snack food has an unexpected, well-received flavor that may be perceived as "buttery." The most preferred waxy corn hybrids is Hybrid 607 Waxy available from Blaney Seeds, Madison, Wisc. Other preferred waxy corn hybrids are Hybrid 3508E and Hybrid 3757E available from Pioneer Hi-Bred International, Inc., Wilmar, Minn. Other examples of waxy corn hybrids that are suitable include Blaney 505, Blaney 602, Blaney 605Wx and Blaney 407Wx from Blaney, Pioneer 3578E from Pioneer, and Viking 5900W from Albert Lea Seed House, Albert Lea, Minn.

Other nonwaxy varieties of corn that can be used for making snack food of the present invention include but are not limited to white corn hybrids (e.g. Hybrid 3463W available from Pioneer), Indian corn (e.g. MN 13 open pollinated from Albert Lea, Minn.), blue corn and sweet corn. Other suitable varieties include yellow dent corn hybrids, for example, Viking 5202 or 5301B or 4240 (Albert Lea Seed House, Albert Lea, Minn.), NC+ Hybrids 3795, 1991 and 2661 (NC, Lincoln, Nebr.) and Sigco 1701 (Sigco, Breckenridge, Minn.).

Generally, although organoleptically acceptable snack foods can be made from nonwaxy corn hybrids with the method of the present invention, the products are not as desirable as snack foods made with the preferred waxy corn hybrids. The kernels may not expand as well, and the product may not taste as good as products made from waxy corn.

Oils

Another component that is important for making a snack food of the present invention is oil. The term "oil" refers to an edible glycerol ester of fatty acids. As used in the present application, "oil" includes such glycerol esters of fatty acids that are derived from animals or plants and may be in a liquid or a solid form at room temperature. The term "room temperature" refers to a temperature that is generally in the range of about 68° F. (20° C.) to about 86° F. (30° C.).

Oils are important for transferring heat to the corn kernels for expanding the corn kernels and for cooking or frying the corn kernels after expansion. Although the application of the present invention is not limited by any theory, it is believed that the expansion of a corn kernel occurs when heat is transferred to the corn kernel in a short period of time to vaporize some of the water inside the corn kernel. The vaporization of water and the expansion of water vapor inside a corn kernel exerts pressure between the starch granules and on the hull (i.e. seed coat) of the corn kernel and eventually ruptures the hull, resulting in expansion of the kernel.

In a soaked corn kernel, water is present between the starch granules. As the corn kernel is heated and the hull ruptured by the expanding water vapor, sometimes some of the starch is pushed by the expanding water vapor out of the ruptured hull, producing a puffing effect on the starch portion of the corn kernel.

In addition to transferring heat to the corn kernel, oil is also important for imparting a particular flavor to the corn snack food. It is common knowledge that different kinds of oil have different tastes and impart different flavors on a food product. This effect may be due to the molecular structure of the oil molecules and/or flavor molecules that are present in the oil. Oils that are commonly used for food can be used for making the corn snack food of the present invention. Particularly suitable are oils derived from plant sources, for example, olive oil, sesame seed oil, sunflower seed oil, canola oil, peanut oil, soybean oil, corn oil, and the like. Because of the capacity of soybean oil to impart a "buttery" flavor to the corn snack food made with kernels of certain waxy corn hybrids, soybean oil is the most preferred in the present invention. Other preferred oils that result in a corn snack food with distinct, preferable flavors include olive oil, and canola oil.

Hydrogenated oils made with oils from plants are also suitable. For example, it has been found that shortenings containing hydrogenated soybean oil (e.g. CRISCO brand available from Proctor and Gamble, Cincinnati, Ohio) can be used to produce acceptable products. It is also practicable to combine different types of oils to impart special flavors to the finished corn snack food. For example, a small amount of animal fat may be used with a preferred vegetable oil for making a product with a distinct flavor. Animal fats such as tallow, butter, lard, chicken fat and the like, as well as any combination thereof may also be used.

An effective amount of a suitable oil is used in the cooking process for expanding and frying the corn kernels without adversely affecting the flavor of the resulting product. A reason for preferring oils from plant sources is that oils or fats that are hydrogenated or highly saturated have been linked to health problems such as heart diseases. Another reason is oils from plant sources, being liquid at room temperature are more easily handled as they can be pumped.

Flavors and Seasonings

It is a common practice to add flavors and seasonings to snack foods. For example, salts, garlic flavor, sour cream flavor and the like have been added to snack foods such as potato chips and corn chips. Likewise, any flavor or seasoning that can be used for snack foods can be applicable for making a corn snack food of the present invention. A non-limiting list of examples of flavors that are suitable include: caramel, cheese (e.g. cheddar cheese), table salt, sea salt, chili powder, garlic, hickory salt, sour cream, chives, onion, chocolate, barbecue flavor, pizza flavor, and taco flavor. If desired, other less commonly used flavors such as tomato, lemon, puree, carrot, parsley, mushroom, basil, ginger, black pepper, white pepper, green pepper, other fruit and root flavors and the like can also be used. When used herein, the term "seasonings" include spices, salt, sweeteners (caramel, chocolate, etc.), flavors and other materials such as herbs and condiments that can give food more flavor or zest.

Typically, when used, seasonings constitute about 0.001 wt. % to about 10 wt. % of the final corn snack food. Because of the wide variation of types of seasonings and preferences in taste, concentrations outside these samples may be practicable. Preferably, seasonings compose about 0.05–0.02 wt. % for sea salt to about 2–5 wt. % for herbs and spices and 10% for chocolate and caramel of the final corn snack food. One of the more preferred seasonings for the present invention is sea salt. Sea salt imparts a surprising, pleasant subtle flavor in the corn snack food. Compared to table salt, sea salt has a less bitter after taste when used in the present invention.

Making the Corn Snack Food

The method of making a corn snack food of the present invention generally relates to (A) preparing the corn kernels for cooking and (B) cooking the corn kernels.

(A) Preparing the Corn Kernels

The weathering of the corn has an effect in the quality of the final snack food product. If the corn, after being picked and left on the cob, has been subjected to rain and freezing temperatures, when subjected to the process of making the corn snack food of the present invention, the corn kernels would not heat expand very well and would result in a final corn snack food product of less superior quality. Therefore, it is preferable that, after harvesting, the corn be protected from rain and below freezing temperatures.

Because the present invention is adapted for making a corn snack food from field corns, consideration is given to cleaning the corn before the cooking process. Leaves, pieces of corn cob material, insects, dust and other foreign matters need to be removed.

For cleaning, corn kernels are put into water in a container and agitated so that foreign matter such as trash, dust, pieces of corn cob or loosened corn hull would be separated from the corn kernels and float on top of the water. The agitation is typically effected by a stirrer or pump. However, any suitable means of agitation known in the art can be used. The floating matters can be separated by overflowing the water over the edge of the container or straining off the top. The container then can be drained and fresh water can be added to repeat the cleaning process. These procedures are only examples of how corn kernels can be cleaned. Alternatively, any commonly used method for cleaning corn kernels can be used. When the desired level of cleanliness has been achieved, the corn kernels are left to soak in the water. The length of time necessary for the soaking process is dependent on the water temperature. For example, if the water temperature is about 55° F. (13° C.), a period of about 7 to about 12 hours generally is adequate. Typically, at the end of the soaking period, the moisture in the soaked corn kernel is more than about 25 wt. %. Preferably the moisture content is about 30 to about 34 wt. %.

The length of time the corn kernels are soaked is also dependent on the moisture level in the corn before the washing and soaking processes. Typically, before harvest, field corn is left in the field to dry to facilitate harvesting by combining mechanically. "Combining" is a method of harvesting with a combine, a machine that heads, threshes, and cleans grain while moving over a field. In the process of combining, the corn kernels are separated from the cob. The corn kernels are then stored in a storage facility such as a grain bin. Typically, corn kernels that are harvested and stored in such a manner have a moisture level of less than about 30 wt. %. For the purpose of making a corn snack food of the present invention, it is preferred that the moisture level in the harvested corn kernels be less than about 20 wt. % and preferably less than about 15.5 wt. %.

The temperature of the water used for the soaking process is not critical as long as the desired moisture content in the corn kernels is achieved. A shorter soaking time may be utilized if the corn kernels are soaked in warmer water. For example, when water of about 110° F. (43° C.) is used for soaking the corn kernels, the soaking time may be reduced by about 1/3 to about ½ compared to soaking in water of about 55° F. (13° C.). Generally, soaking the corn kernels in water for a longer period of time does not produce detrimental effects other than the possibility of an increase in microbial growth in the soaking water. Based on the desired moisture level of soaked corn, the soaking time and temperature can be optimized by applying generally known and commonly practiced routine procedures of experimentation.

After an adequate period of time has been allowed for the soaking process, the corn kernels are separated from the water and preferably allowed to rest for a period of time so that the moisture can be more evenly distributed within the corn kernels. During this period of rest, some of the water that is left on the surface of the corn kernels is absorbed into the corn kernels. The reduction of water on the surface of the corn kernels aids in reducing the amount of splattering when the corn kernels are introduced into hot oil to be expanded and fried. The minimizing of water left on the surface of the corn kernels also would help to reduce heat loss due to excessive water evaporation.

Typically, the time allowed for the corn kernel to rest after separating from the soaking water is about 3 hours to about 12 hours, and preferably about 7 hours to about 9 hours at an ambient temperature of about 70° F. Generally, this period of time is dependent on the ambient temperature. If the ambient temperature is low, a longer period of time would be needed. Again, this "resting" time can be optimized by utilizing generally known and routine procedures of experimentation. After soaking, the kernels generally have an increase in volume of 10–20% because of the absorption of water.

Though preferable, the period of rest is not always necessary if enough time is allowed for the corn kernels to absorb adequate amounts of water and for the water to penetrate well into the corn kernels. Other effective ways of removing excess water from the surface of the corn kernels can also be utilized. For example, the corn kernels can be centrifuged to spin off the water. Another example of a suitable drying method is absorbing water from the surface of the kernels using absorbing materials.

(B) Cooking the Corn Kernels

The corn snack food is made by heating soaked corn kernels in an edible oil. Preferably, the cooking process involves two features: heat expanding the corn kernels and cooking or frying the expanded corn kernels. Expanding and frying of the corn kernels can take place in the same cooking device or in separate cooking devices. If the expansion and frying steps are to take place in the same volume of edible oil in the same device, a suitable range of temperature for the cooking process is about 302° F. (150° C.) to about 401° F. (205° C.) and preferably about 356° F. (180° C.) to about 383° F. (195° C.). The cooking process results in expansion of a high percentage of the corn kernels and a product of good flavor and texture if the temperature can be maintained throughout the expanding and frying stages in the range described. In such a case, the soaked corn kernels increase in volume almost immediately as they are introduced into the hot edible oil. If the temperature falls too much, the efficiency of expansion will decrease, resulting in many insufficiently expanded corn kernels. However, if the starting temperature has been set too high so as to maintain an adequate temperature for expansion, the final product may have a burned flavor.

If the expansion and frying steps are to take place in the same cooking device, preferably an adequate amount of oil is utilized for facilitating both the expansion and frying. Typically, the weight ratio of the amount of oil to soaked corn in such a process is about 1:1 and higher, and preferably about 25:1 to about 30:1. A large oil to soaked corn ratio aids in maintaining a steady cooking temperature. The upper limit of this ratio is dictated more by economics of oil use than by the quality of products.

Optionally, the expansion step and the frying step can be done in separate devices. For example, the corn kernels can be expanded with oil in a first device and then the expanded corn kernels can be transferred into a different device to be fried. As an alternative, corn kernels can also be heat expanded using hot air methods or other commonly practiced methods of heating corn with little or no added amount of oil. Such a cooking method involving two separate devices is particularly adaptable for producing large amounts of the corn snack food, as in commercial production of the present invention. When this two-step cooking process is used, depending on the method of heat expansion, the weight ratio of the amount of oil to the soaked corn in the expanding process can be 0:1 to $\infty$:1, preferably about 25:1 to about 50:1, and more preferably about 25:1 to about 30:1. However, in the frying process, an adequate amount of oil is used for properly frying the expanded corn kernels. The weight ratio of the amount of oil to the soaked corn kernels, is about 1:1 to about 4:1, preferably about 2:1 to about 3:1. Again, the upper limit of this ratio is constrained more by economic considerations than by product quality.

Generally, the corn kernels enlarge or expand almost immediately as they are introduced into the hot oil. Typically, the expansion in volume is less than 1000%, and often less than 500%. Corn snack foods of the desirable flavor and mouthfeel characteristics can be produced with a heating time of about 2 to 4 minutes at a temperature of about 375° F. (190° C.). The heating or frying time can be varied depending on the temperature of the cooking oil. The cooking time and temperature can be optimized to be equivalent to about 2 to 5 minutes of frying time at a temperature of about 375° F.

(190° C.) by utilizing commonly known and routinely practiced procedures of experimentation.

In contrast with popped popcorn, the expanded corn kernel of the present invention has a volume increase of less than 5 folds, and preferably is expanded to a volume of about 2.5 folds that of unexpanded kernels. Alternatively, if desired, a corn snack food can be made with frying but without substantive expansion, since some individuals may preferred a snack with a harder mouth-feel. In this case, parameters such as cooking temperature and moisture content may be adjusted to reduce expansion. Generally, a lower frying temperature, e.g. (below 325° F. (163° C.)) or lower moisture content (e.g. below 20 wt. %) results in reduced expansion. The frying time may be increased to produce the desired fried flavor if a lower temperature is used.

Any commonly used frying equipment is suitable for the frying process. For example, for batch production, a frying pan or pot can be used. The size of the cooking utensil varies depending on the size of the batch. Selection of cooking equipment can be done with commonly known procedures and routine methods of experimentation. Typical frying equipment include, for example, Batch Oil Roaster available from Mastermatic, Concord, N.H.

Continuous manufacturing of the snack food of the present invention can also be done using equipment having a conveyor belt for continuously moving the corn kernels. The continuous movement allows the kernels to be fried in the hot oil for a specific period of time effective for making snack foods with the desired flavor and texture.

After an adequate period of time has been allowed for heat expanding and frying the corn kernels, the fried corn kernels are separated from the hot oil and allowed to cool before packaging. This cooling period allows the oil to drain from the fried corn kernels and for moisture to escape. At this time, optional seasonings can be added to the expanded, fried corn kernels.

Additional, if desired, a step can be employed to remove loosened pieces of corn hull. A wide variety of methods appropriate for separating solid particles of different sizes, shapes or densities may be used. For example, air classification or sifting means can be effective in this separation. The loosened pieces of corn hull can be removed before and/or after cooking in oil.

EXAMPLES

The invention will be further exemplified with respect to the various specific and preferred embodiments and techniques. It should be understood, however, that many variations and modifications can be made while remaining within the scope of the invention.

Example 1

Waxy corn kernels (150 g, Blaney Hybrid 607, Blaney Seed Company, Madison, Wisc.) was soaked in 80° F. (28° C.) tap water for twelve hours in a container. Then the water was drained from the container and the corn kernels were allowed to rest in the container without being moved or disturbed for ten hours. Soybean oil (750 ml) was added into a frying pot and heated to about 375° F. (190° C.). The depth of the oil in the frying pot was ½ inch. The soaked corn kernels were added into the hot oil and fried for 4 min. The expanded corn kernels were then removed from the hot oil and put on a screen to allow the excess oil to drain from the corn kernels. Sea salt (0.15 g.) was added to the corn kernels with thorough mixing.

Example 2

Waxy corn kernels (150 g, Pioneer Hybrid 3508E, Wilmar, Minn.) was soaked in 80° F. (28° C.) tap water for fifteen hours in a container. After soaking, the water was drained from the container and the corn kernels were dried by dabbing the kernels with dried towels. Soybean oil (750 ml) was added into a frying pot and heated to about 352° F. (178° C.). The depth of the oil in the frying pot was ½ inch. The soaked corn kernels were added into the hot oil and fried for 3½ min. The expanded corn kernels were then removed from the hot oil and put on a screen to allow the excess oil to drain from the corn kernels. Sea salt (0.15 g.) was added to the corn kernels with thorough mixing.

Example 3

Waxy corn kernels (100 g, Pioneer Hybrid 3757E, Wilmar, Minn.) was soaked in 80° F. (28° C.) tap water for twelve hours in a container. Then the water was drained from the container and the corn kernels were allowed to rest in the container without being moved or disturbed for ten hours. Soybean oil (300 ml) was added into a frying pot and heated to about 330° F. (165° C.). The depth of the oil in the frying pot was about ¼ inch. The soaked corn kernels were added into the hot oil and fried for 5 min. The expanded corn kernels were then removed from the hot oil and put on a screen to allow the excess oil to drain from the corn kernels. Sea salt (0.1 g.) was added to the corn kernels with thorough mixing.

Example 4

Waxy corn kernels (150 g, Pioneer Hybrid 3463W, Wilmar, Minnesota) is soaked in 75° F. (24° C.) tap water for fifteen hours in a container. Then the water is drained from the container and the corn kernels are allowed to rest in the container without being moved or disturbed for ten hours. Soybean oil (750 ml) is added into a frying pot and heated to about 375° F. (190° C.). The depth of the oil in the frying pot is ½ inch. The soaked corn kernels are added into the hot oil and fried for 4 min. The expanded corn kernels are then removed from the hot oil and put on a screen to allow the excess oil to drain from the corn kernels. Sea salt (0.15 g) is added to the corn kernels with thorough mixing.

Example 5

Waxy corn kernels (150 g, Viking Hybrid 6050, Albert Lea Seed House, Albert Lea, Minn.) is soaked in 80° F. (28° C.) tap water for fifteen hours in a container. Then the water is drained from the container and the corn kernels are allowed to rest in the container without being moved or disturbed for ten hours. Sesame oil (750 ml) is added into a frying pot and heated to about 375° F. (190° C.). The depth of the oil in the frying pot is ½ inch. The soaked corn kernels are added into the hot oil and fried for 4 min. The expanded corn kernels are then removed from the hot oil and put on a screen to allow the excess oil to drain from the corn kernels. Sea salt (0.15 g.) is added to the corn kernels with thorough mixing.

DATA RE KERNEL SIZE

Generally field corn kernels, for example, yellow dent or waxy corn, have a slightly elongated shape. A dry field corn kernel typically has a length of about 0.5 inch. A dry field corn kernel may have a slightly flat feature or be slightly round. The width may be about 3/8 inch and the thickness may be about the same as the width or slightly less. Of course, depending on the field corn variety and growing conditions, the size of the kernel can vary from the above description.

The processing of a field corn kernel into the expanded snack food of the present invention changes the shape of the kernel slightly. The width and thickness of the kernel may change due to the rupturing of the kernel. Generally, the length remains substantially unchanged because the rupturing usually does not occur along the length of a kernel. The increase of kernel size is difficult to measure for individual kernels. However, if an amount of dry field corn kernels taken from a jar is processed into a snack food of the present invention and the product is put back into the same jar, the product has a volume which is about 2 to 5 times that of the starting dry corn kernels, and more typically about 2.5 to 4 times. Therefore, this increase in volume includes the air space inside each expanded kernel and between the individual kernels.

All percentages expressed herein are weight percentages unless indicated otherwise.

The foregoing detailed description has been given for clarity of understanding only and not as limitations. The invention is not limited to the exact details shown and described. Obvious modifications can be made by a person skilled in the art without departing from the invention. The scope of the invention is set forth in the appended claims.

What is claimed is:

1. A method of producing an expanded corn snack food, which method comprises:
   (a) preparing dried corn kernels of a corn variety with a moisture content of less than about 20 wt. %;
   (b) contacting the dried corn kernels with water to increase the moisture content to above about 25 wt. % to form a soaked corn kernel;
   (c) separating the soaked corn kernels from the water;
   (d) heating the soaked corn kernels in an effective amount of an edible oil at a temperature of about 300° F (150° C.) to about 400° F. (205° C.) for a time sufficient to cook the corn kernels, without adversely affecting the flavor of the resulting cooked corn kernels, to result in an expanded kernel; and
   (e) separating and cooling the expanded corn kernels from the oil.

2. The method of claim 1 further comprising, after separating the soaked corn kernels but before heating, allowing the separated soaked corn kernels to rest for a time sufficient to substantially dry the surface of the soaked corn kernels and also allow more uniform distribution of moisture within the soaked corn kernels before cooking.

3. The method of claim 1 wherein:
   (a) the corn variety is a waxy hybrid corn known as Blaney Hybrid 607 (Blaney Seed Co., Madison, Wisc.);
   (b) the moisture content in a soaked corn kernel before cooking is about 30 to about 35 wt. %;
   (c) the separated soaked corn kernels are allowed to rest for a time of more than 4 hours to substantially dry the surface of the soaked corn kernels and also to allow more uniform distribution of moisture within the corn kernels before cooking;
   (d) the edible oil is soybean oil;
   (e) the time and temperature of frying are equivalent to about 4 minutes at an oil temperature of 375° F. (190.5° C.); and
   (f) the expanded corn kernels are seasoned with sea salt after the corn kernels are separated from the cooking oil.

4. The method of claim 1 wherein the weight ratio of oil to soaked corn kernels is at least 2:1, and the volume increase of the kernels is less than about 500 %.

5. The method of claim 2 wherein the expansion and the heating take place in an effective amount of an edible oil in the same device at a temperature of about 300° F. (150° C.) to about 400° F. (205° C.) for a time sufficient to expand and cook the corn kernels without adversely affecting the flavor of the resulting cooked corn kernels.

6. The method of claim 2 wherein the expansion and the heating in oil take place in separate devices.

7. The method of claim 2 further comprising expanding the soaked corn kernels by hot air heating before heating in oil.

8. The method of claim 1 further comprising separating loosened pieces of hull from the corn kernels.

9. The method of claim 1 further comprising adding a seasoning.

10. The method of claim 1 wherein the edible oil is selected from the group consisting of olive oil, sesame seed oil, sunflower seed oil, cotton seed oil, canola oil, peanut oil, soybean oil, corn oil and hydrogenated oils thereof.

11. A method of producing an expanded corn snack food, comprising:
   (a) preparing dried corn kernels of a waxy corn hybrid with a moisture content of less than about 20 wt. %;
   (b) contacting the dried corn kernels with water to increase the moisture content to about 30–35 wt. % to form a soaked corn kernel;
   (c) separating the soaked corn kernels from the water;
   (d) heating the soaked corn kernels in an effective amount of soybean oil at a temperature of about 356° F. (180° C.) to about 383° F. (195° C.) for a time sufficient to cook the soaked corn kernels, without adversely affecting the flavor of the resulting cooked corn kernels, to result in an expanded kernel;
   (e) separating and cooling the expanded corn kernels from the oil; and
   (f) seasoning the cooked corn kernels with sea salt.

12. (Once Amended) A snack food made with a process comprising:
   (a) preparing dried corn kernels of a selected corn variety with a moisture content of less than about 20 wt. %;
   (b) contacting the dried corn kernels with water to increase the moisture content to above about 25 wt. % to form a soaked corn kernel;
   (c) separating the soaked corn kernels from the water;
   (d) heating the corn kernels in an effective amount of an edible oil at a temperature of about 300° F. (150° C.) to about 400° F. (205° C.) for a time sufficient to cook the soaked corn kernels, without adversely affecting the flavor of the resulting cooked corn kernels, to result in an expanded kernel; and (e) separating and cooling the expanded corn kernels from the oil.

13. A snack food of claim 12 further comprising: adding a seasoning to the cooked corn kernels; and wherein the corn variety is a field corn.

14. A snack food of claim 12 wherein:
(a) the corn variety is a waxy corn hybrid known as Blaney Hybrid 607 (Blaney Seed Co., Madison, Wis.);
(b) the moisture content in a soaked corn kernel before frying is about 30 to about 35 wt. %;
(c) after expanding the soaked corn kernels but before heating, the separated soaked corn kernels are allowed to rest for a period of more than 4 hours to substantially dry the surface of the soaked corn kernels and also to allow more uniform distribution of moisture within the soaked corn kernels before cooking;
(d) the edible oil is soybean oil;
(e) the time and temperature of heating in the soybean oil are equivalent to about 4 minutes at an oil temperature of 375° F. (190.5° C.); and
(f) the cooked corn kernels are seasoned with sea salt after the cooked corn kernels are separated from the soybean oil.

15. The method of claim 1 further comprising adding a flavoring.

* * * * *